Figure 1:
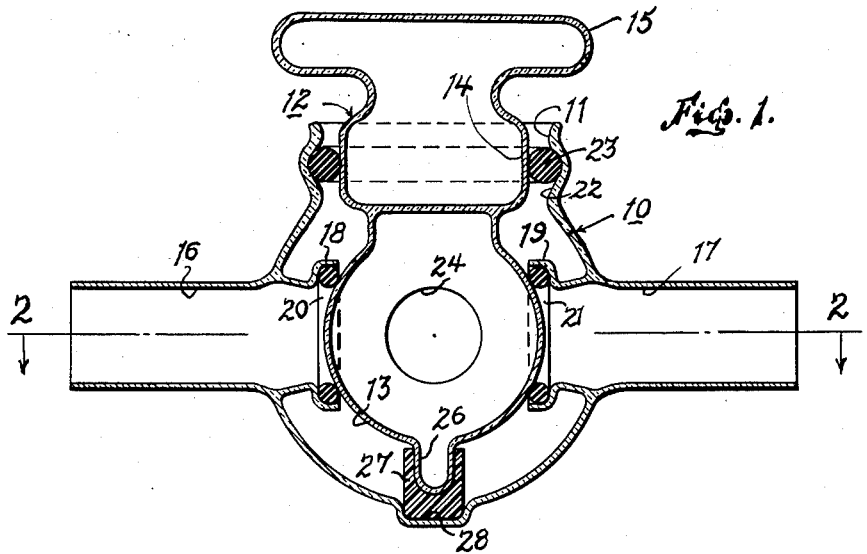

Nov. 19, 1963 M. D. PERSIDSKY 3,111,136
VACUUM SEALED ROTARY GLASS VALVE
Filed May 18, 1962 2 Sheets-Sheet 1

INVENTOR.
MAXIM D. PERSIDSKY.
BY
ATTORNEY

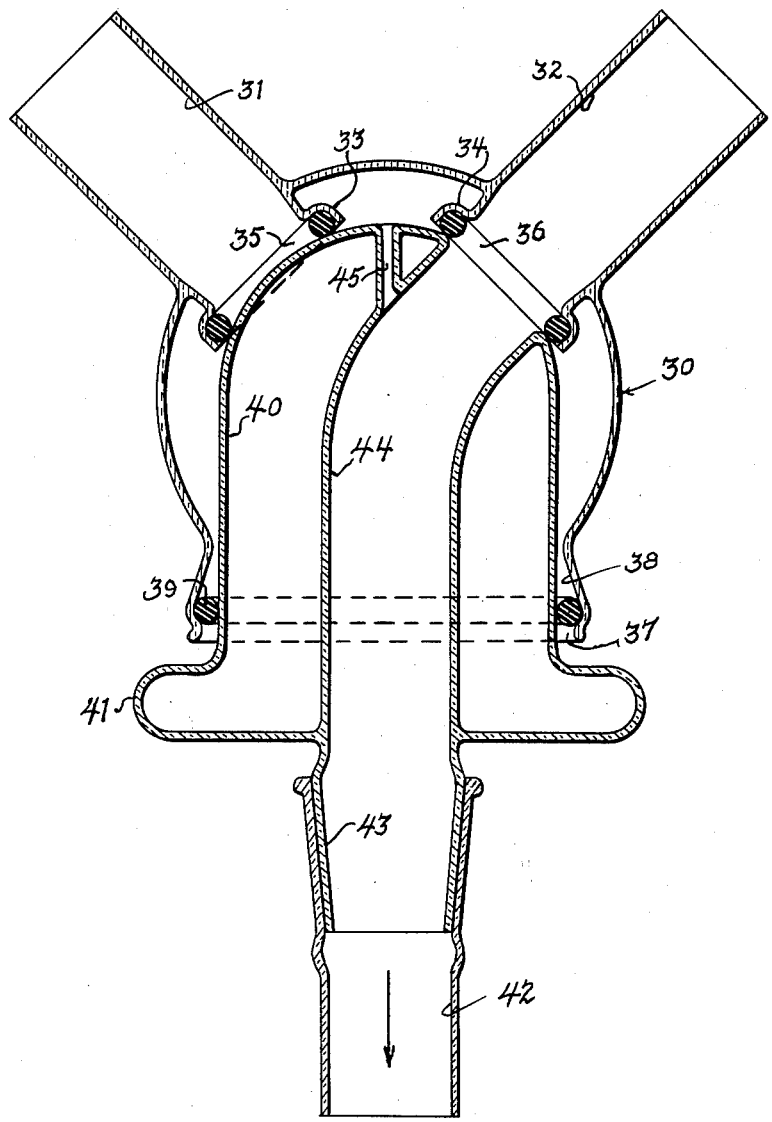

United States Patent Office 3,111,136
Patented Nov. 19, 1963

3,111,136
VACUUM SEALED ROTARY GLASS VALVE
Maxim D. Persidsky, 554 9th Ave.,
San Francisco 18, Calif.
Filed May 18, 1962, Ser. No. 195,786
3 Claims. (Cl. 137—315)

My present invention relates to valves and particularly to the construction of valves of inert non-corrosive material such as glass for scientific laboratory purposes.

The principal object of my invention is to provide a valve of glass for laboratory use which is self-sealing and chemically inert.

A further object of the invention is to provide an improved valve for the transmission of gasses or a vacuum line which is simple, practical, and of novel construction.

A further object of the invention is to provide a valve having its principal parts formed of glass and incorporating sealing means of non-metallic, compressible and chemically inert material.

Another object of the invention is to provide a valve having a body and valve member constructed entirely of glass in which O-rings are employed in a novel manner to form a seal between the relatively moveable parts.

In various types of research work and particularly in connection with chemical and scientific research the apparatus is most often constructed of glass and where possible it is desirable to form the various portions of the apparatus of glass and while the art abounds plug or stopper type valves constructed entirely of glass, these are generally of very small size and therefore in the larger installations resort is generally had to the use of stainless steel or other non-corrosive materials which when combined with other elements offer difficulties in observing the action thereof and in making connections therewith. This is particularly true in the case of vacuum line controlling valves and it is therefore a primary object of my invention to provide a valve constructed of glass having a novel self-sealing means that is simple in construction, and well within the skill of an experienced glass blower.

Other objects and advantages will be in part evident to those skilled in the art and in part pointed out hereinafter in the following description taken in connection with the accompanying drawings wherein there in shown by way of illustration and not of limitation preferred embodiments of my invention.

Figure 2:
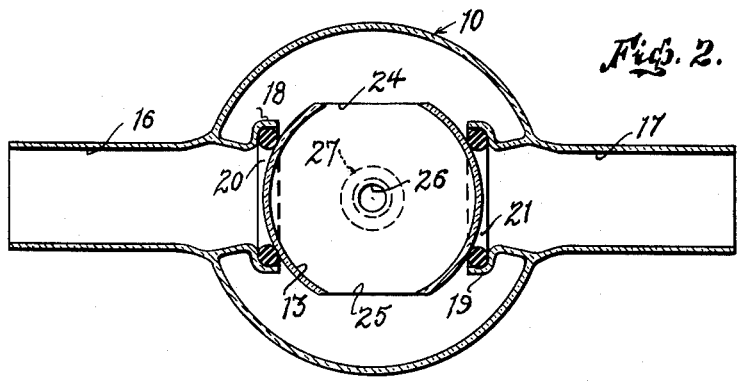

In the drawings:

FIGURE 1 is a vertical sectional view taken centrally along the vertical plane of a one-way valve, FIGURE 2 is a horizontal sectional view taken along line 2—2 of FIGURE 1, and FIGURE 3 is a vertical sectional view of my invention as applied to a three-way valve.

For a better understanding of the invention reference is now made to FIGURES 1 and 2 of the drawings wherein the numeral 10 designates generally the body of a valve of substantially spherical form having opening 11 at its top through which a valve member designated generally by the numeral 12 is inserted. This valve member 12 has a spherical end portion 13 at its inner end that is adapted to operate centrally within the valve body 10. Immediately above the spherical portion 13 of the valve member 12 there is a cylindrical stem portion 14 which is centered within the opening 11 of the valve body 10 and outwardly therefrom the valve member is enlarged to form an operating handle or extension 15 by which it may be turned in opening and closing the valve. In this showing the spherical portion 10 of valve has oppositely extending conduits 16 and 17 by which connections may be made in a vacuum conducting system. These conduits 16 and 17 are shown as extended into the body 10 of the valve and are formed to provide cuplike seats 18 and 19 within which O-rings 20 and 21 of elastomeric material are adapted to be held for contact with the outer spherical surface of the portion 13 of the valve member 12. Similarly the open end 11 of the valve body 10 is also formed as at 22 to provide a recessed seat for an additional O-ring 23 that is adapted and arranged to be held in sealing relation with the cylindrical stem portion 14 of the valve member 12. The spherical portion 13 of the valve member 12 is also provided with two oppositely disposed passageways 24 and 25 that will be positioned in to register with the conduits 16 and 17 when the valve is in its open condition. While the O-rings 20 and 21 could conceivably serve and function to center the spherical portion 13 of the valve member 12 in proper cooperating relation with the O-rings 20 and 21 of the conduits 16 and 17 I have here shown this portion 13 as having a protuberance 26 that is seated in a supporting block 27 of relatively solid material which is centered in a recess 28 formed oppositely and centrally of the opening 11 of the valve body 10.

With the valve constructed as above described it will be seen that if either of the conduits 16 or 17 are connected to a vacuum line the several compressible O-rings 20, 21 and 23 will be subjected to a pressure differential that will cause them to more effectively provide a seal at the point of contact with the valve member 12. While it might appear under the assumed condition, that with a vacuum present in the conduit 17 the O-ring 21 might be drawn away from the spherical portion 13 of the valve number 12 it will be seen that should there be any leakage at this point, the spherical body portion 10 of the valve would immediately become evacuated and this differential of pressure would then operate to suck the O-ring 21 into sealing relation with the portion 13. At the same time the O-ring 23 would be sucked in to provide an effective seal about the valve stem portion 14 and with this sense it will be also apparent that the two O-rings 20 and 21 will combine to complete the sealing of the valve member 12.

In FIGURE 3 of the drawing there is shown a modification of my invention in the form of a 3-way valve constructed of glass. In this showing the numeral 30, designates generally a spherical valve body having two circumferentially spaced and radial extending conduits 31 and 32 that are formed as integral parts thereof. These conduits 31 and 32 like the conduits 16 and 17 of the previously described valve are extended inwardly to form annular recesses 33 and 34 into which O-rings 35 and 36 are respectively seated. At a point opposite the conduits 31 and 32 the valve body 30 has an opening 37 which is flared slightly outward as at 38 to provide a seat for an additional O-ring 39 that serves to effectively seal a dome like valve member 40 within the valve body 30 as illustrated. The dome like valve member 40 is flared outwardly at its extending end to provide a grip means or handle 41 by which it may be turned to select one or the other of conduits 31 and 32. The valve member 40 is shown as connected with an evacuated conduit 42 by a nipple like extension 43 upon the valve member 40 and extending upwardly from the nipple 43 and curved for alignment with one or the other of the conduits 31 or 32 the valve member is shown as having an internal tubular conduit 44 that has an open upper end for connection with the aforesaid conduits. In order to complement the sealing of the valve member 40 within the valve body 30, by the O-rings 35, 36 and 39, I provided a bleeding passageway 45 through which air will be exhausted from the body member 30 when the valve is in use and thus provide a suction like effect upon each of the O-rings which will insure against any leakage at these points. In this arrangement the valve member 40 is shown as having a ground glass connection with the conduit 42 so that it may be readily disconnected for establishing connection with either of the conduits 31 and 32. However it is conceivable that an O-ring seal as described above may be provided at this point.

While I have, for the sake of clearness and in order to disclose my invention so that the same can be readily understood, described and illustrated specific forms and arrangements, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A valve constructed of glass for controlling the flow of fluids in scientific laboratory apparatus, comprising a valve body of blown glass having external tubular extensions for connection with other apparatus, each of said extensions being projected into said valve body and being formed at their inner ends to provide annular recesses into which O-rings of elastomeric material may be seated, said valve body also having a rotatable valve member accommodating opening formed with an O-ring seating recess, a rotatable valve member insertable through the accommodating opening of said valve body having a bulbular end with spherical surfaces for engagement with O-rings seated in the recesses carried by said conduits, said valve member having a flow passageway therethrough which may be aligned or misaligned with the tubular extensions of said valve body, a cylindrical stem forming portion carried by said rotatable valve member disposed in cooperation with the O-ring seating recess in the valve accommodating opening of said valve body, and an O-ring of elastomeric material in each of the recesses carried by said tubular extensions and the valve accommodating opening of said valve body.

2. In a valve constructed entirely of glass for scientific research and laboratory use, the combination of valve body portion of blown glass having external tubular conduits welded in the walls thereof, said conduits being also projected into said valve body portion and formed to provide seats for O-ring seals at their inner ends, said valve body having a stem accommodating opening through which a valve member may be projected and positioned within said body portion having an annular O-ring accommodating recess, a sealing O-ring positioned in said annular recess, a valve member of blown glass having a bulbular portion of a spherical form adapted and arranged to pass through the stem accommodating opening of the valve body and having oppositely disposed openings forming a passageway therethrough adapted and arranged to be turned into alignment with the external tubular conduits of said valve body, said valve member also having a cylindrical portion, forming a projecting stem disposed within the stem accommodating opening of said body member, and characterized by the fact that the seats at the inner ends of said tubular conduits each carry an O-ring of elastomeric material to provide a seal between said body member and said valve member when said valve is in its open and closed positions of use.

3. A valve constructed of glass for controlling the flow of fluids in scientific laboratory apparatus, comprising a valve body of blown glass having external tubular extensions for connection with other apparatus, each of said extensions being projected into said valve body and being formed at their inner ends to provide annular recesses into which O-rings of elastomeric material may be seated, said valve body also having a rotatable valve member accommodating opening formed with an O-ring seating recess, a rotatable valve member insertable through the accommodating opening of said valve body having a bulbular end with spherical surfaces for engagement with O-rings seated in the recesses carried by said conduits and having a passageway therethrough for alignment or misalignment with the extensions of said valve body, a cylindrical stem forming portion carried by said rotatable valve member disposed in cooperation with the O-ring seating recess in the valve accommodating opening of said valve body, an O-ring of elastomeric material seated in each of the recesses carried by said tubular extensions, and a non-metallic supporting block positioned within said valve body for maintaining the spherical surface of said valve member in sealed relation with the O-rings carried by the recesses at the inner ends of said tubular extensions of valve body.

References Cited in the file of this patent
UNITED STATES PATENTS

| | | |
|---|---|---|
| 1,973,754 | Geyer | Sept. 18, 1934 |
| 2,839,094 | Kaiser | June 17, 1958 |
| 2,911,009 | Parker | Nov. 3, 1959 |